Nov. 22, 1966

D. ATLAS 3,287,728

ZONED RADIANT ENERGY REFLECTOR AND ANTENNA HAVING A GLORY RAY
AND AXIAL RAY IN PHASE AT THE FOCAL POINT

Filed May 7, 1963

INVENTOR.
DAVID ATLAS
BY Wade Loonty
Sherman H. Goldman
ATTORNEYS

Nov. 22, 1966

D. ATLAS 3,287,728

ZONED RADIANT ENERGY REFLECTOR AND ANTENNA HAVING A GLORY RAY AND AXIAL RAY IN PHASE AT THE FOCAL POINT

Filed May 7, 1963

INVENTOR.
DAVID ATLAS
BY Wade Loomy
Sherman H. Goldman
ATTORNEYS

United States Patent Office 3,287,728
Patented Nov. 22, 1966

1

3,287,728
ZONED RADIANT ENERGY REFLECTOR AND ANTENNA HAVING A GLORY RAY AND AXIAL RAY IN PHASE AT THE FOCAL POINT
David Atlas, 62 Wiswall Road, Newton Center, Mass.
Filed May 7, 1963, Ser. No. 278,791
16 Claims. (Cl. 343—753)

The invention described herein may be manufactured and used by or for the United States Government for governmental purposes without payment to me of any royalty thereon.

This invention relates generally to a focusing device wherein energy at the focal point is in perfect phase with energy along a plane perpendicular to the axis of transmission. More particularly, the device includes means at the focal point for directing the energy, for example, by means of a reflector or receiving and transmitting antennae.

Heretofore, radiant energy reflectors have utilized either a Luneberg lens or a lens of constant refractive index with a metal cap at the rear of either or both. The Luneberg lens is complex and expensive to construct and with diameters smaller than 7 or 10 wavelengths has limited reflective cross-section. The constant refractive index lens without the optimization of this invention also has a limited reflective cross-section. The present invention overcomes these limitations by utilizing an ordinary sphere with constant refractive index wherein the major rays contributed to the backwards reflection are brought into perfect phase with each other such that the vector sum of their individual reflective fields is maximized.

The present invention provides a means for maintaining inphase addition of three reflected rays, thereby maximizing the radar cross-section of the target. The provision of structure to produce this maximization involves the addition of a separate cap or spherical segment of dielectric material to the sphere at a position opposite the metal segment or cap. The resultant reflector has a constant gain over a broad angle equal to the size of the cap and has a gain larger than that obtained with the Luneberg lens up to diameters equal to 7–10 wavelengths, depending upon the refractive index, without having the need to taper the refractive index.

Since the in-phase relationship is maintained at the focal point and at a plane perpendicular to the axis of the lens, the device also has utility where the energy at the focal point would be utilized by either a transmitting or receiving means.

Accordingly, it is an object of this invention to provide a radiant energy focusing device which provides for an in-phase relationship between the reflected axial and glory rays.

It is another object of this invention to provide a sphere of a constant dielectric constant having a dielectric cap at one position on said sphere and transmission or receiving means at a position diametrically opposite said dielectric cap.

It is still another object of this invention to produce a broad angled radiant energy reflector which provides a maximum reflective cross-section of a target.

It is a further object of this invention to provide a combination structure of a radiant energy reflector comprising a dielectric sphere having a reflector cap at one point on said sphere and a dielectric cap at a position diametrically opposite said metal cap.

It is a still further object of this invention to provide a radiant energy reflector for receiving incident rays at various points on the surface of a dielectric sphere and for maintaining an in-phase relationship at the focal point of those received on an axis of the sphere and those which are received parallel to the diametral axis.

Another object of this invention is the provision of a means to maximize the reflectivity of optical glass reflectors such as those used for automobile and bicycle reflectors and beaded projection screens.

Still another object of this invention is to provide a novel metal capped, zoned, spherical dielectric reflector which is facile of construction of conventional, currently available materials which lend themselves to standard, mass production manufacturing techniques.

These and other advantages, features and objects of the invention will become more apparent from the following description taken in connection with the illustrative embodiment in the accompanying drawings, wherein:

FIGURE 1 comprises an equatorial cross-section of a capped, zoned, spherical dielectric reflector;

Figure 1:
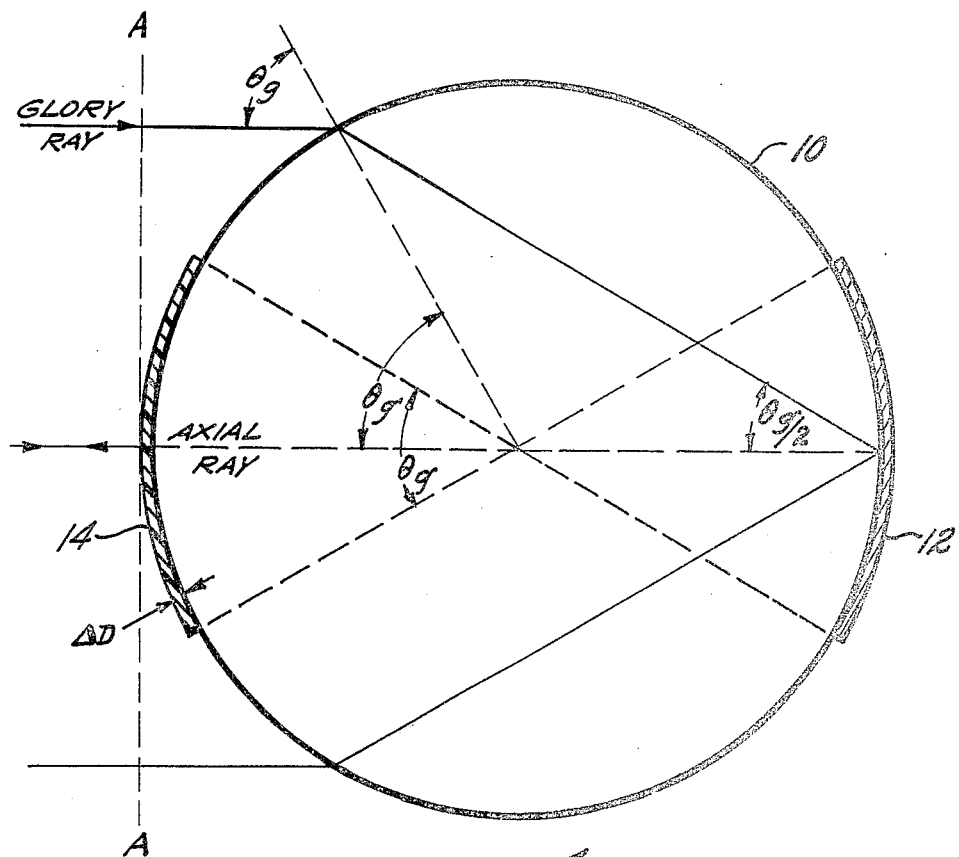

Referring to FIGURE 1, which illustrates the utilization of this invention as a reflector, there is shown a sphere 10 having a single index of refraction rather than a tapered index of refraction which is a requirement of the Luneberg lens. In this embodiment, the sphere has a reflecting cap 12, preferably metallic, applied to the surface of the sphere and bounded by a zone or circle of said surface. In a position opposite the metal cap 12 and bounded in the same manner, there is applied a dielectric cap which may be of the same material as the sphere and integral therewith, or it may be a separate component applied to the dielectric sphere 10 and of a different refractive index.

By adding a dielectric spherical segment of a shell or a cap 14 at the front of the sphere 10, the cap being of a prescribed thickness, the three component rays reflected in the backward direction are brought into perfect phase with each other. The three components are (1) the fraction of the axial ray reflected at the front surface, (2) the portion of the axial ray which is transmitted into the sphere along the axis of revolution and reflected from the back surface 12, and (3) an off axis ray parallel to the others. The so-called glory ray, which enters the sphere off axis at an angle of incidence depending upon the refractive index, comes to a perfect focus at the rear surface 12 and is reflected therefrom along a mirror image path to the front so that it is in perfect phase with the axial components along A—A. A glory ray occurs in a sphere at indexes of refraction of approximately 1.4 to 2. In the case of the application of these principles to an antenna or transmission or receiving device (FIGURES 3 and 4) the rays would be in-phase at the focal point so that the antenna gain in the direction of the axis is maximized.

Referring to the illustration of FIGURE 1 the required thickness $\Delta D$ of the dielectric cap 14 to produce the proper in-phase relationship may be derived by the following computations. The phase of the rear surface reflected axial ray taken with respect to line A—A is:

$$\varphi_1 = m[2D + 2\Delta D]2\pi\lambda - \pi \quad (1)$$

where $D$ is the sphere diameter, $m$ the refractive index and $\lambda$ is the wavelength. By construction, we also find that the phase of the reflected glory ray with respect to line A—A is:

$$\varphi_2 = D[(1-\cos\theta_g)+2m\cos(\theta_g/2)]2\pi/\lambda - \pi$$
$$+ 2(\Delta D)2\pi/\lambda \quad (2)$$

The additional shift of $-\pi$ in both equations, which is not directly evident in the geometry of the figure, is due to the crossing of a double caustic. By Snell's law, we find for the glory ray that:

$$\cos(\theta_g/2) = m/2 \quad (3)$$

and $$\cos\theta_g = (m^2 - 2)/2 \quad (4)$$

which, when substituted into (2), gives:

$$\varphi_2 = [2D(m^2+4)/4 + 2\Delta D]2\pi/\lambda - \pi \quad (5)$$

The two reflections will add in-phase when:

$$\varphi_1 = \theta_2 + n2\pi \quad (6)$$

where $n$ is a positive integer. From Equations (1), (5) and (6) we find, after algebraic manipulations that the thickness of the dielectric front cap must be:

$$\Delta D = D[4 + m^2 - 4m - (\lambda/D)(2n)]/4(m-1) \quad (7)$$

For practical purposes, we choose the smallest value of $n$ which gives us the smallest positive value of $\Delta D$. If the cap is made of a dielectric of refractive index $m'$ different from that of the sphere, then the thickness becomes:

$$\Delta D' = (\Delta D)m/m' \quad (8)$$

In order to take advantage of the small additional reflection from the front surface, the distance $D+\Delta D$ should be chosen so that:

$$\varphi_1 = 2m[D+\Delta D]2\pi/\lambda = K2\pi \quad (9)$$

where K is an integer, or $$D + \Delta D = K\lambda/2m \quad (10)$$

In other words $\Delta D$ is chosen to obtain perfect in-phase relationship between the glory ray and the rear surface axial ray and the diameter D is chosen to obtain in-phase relationship of the front surface axial ray with the other two rays. In the case of the antenna where transmission is in one direction, the path lengths through the dielectric are reduced to one-half and the optimum thickness $\Delta D$ and an optimum diameter D are chosen accordingly.

The front dielectric cap must not be made so large as to interfere with the glory ray; therefore, its maximum angular dimension should be slightly less than $2\theta_g$ as given by Equation (4). However, this will make the maximum gain very sensitive to the direction of viewing. An optimum angular size, therefore, should be approximately $\theta_g$, i.e., slightly less or slightly greater than $\theta_g$, for the front dielectric cap and slightly greater for the rear metal cap. The gain will then be constant over an angle of slightly less than $\theta_g$.

In actual practice the focus at the rear surface is not a point but a spot having diameter approximately 15 to 20 degrees as measured from the center of the sphere; therefore, in order to maximize the gain over the full angular dimension of the front dielectric cap the rear cap should have an angular dimension approximately 15 to 20 degrees larger than that of the front. This allows for the reception of energy over an angular rotation of the sphere with respect to the direction of reception equal to the glory angle $\theta_g$.

Figure 2:
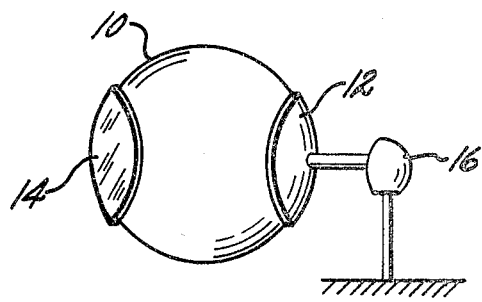
FIGURE 2 is a schematic representation of the dielectric reflector of this invention mounted for rotation in a conventional manner.

As shown in FIGURE 2, the dielectric reflector of this invention may be mounted in any conventional manner in order that it may be rotated and adjusted. Although the mounting is shown applied to the cap 12, the device may be rotated about another portion of the sphere, bearing in mind that the mounting should not be placed at a point where incident energy would be affected by the mounting structure. The mounting structure should have minimum reflecting characteristics. Rotation of the lens would have particular utility as a modulated reflector.

Figure 3:
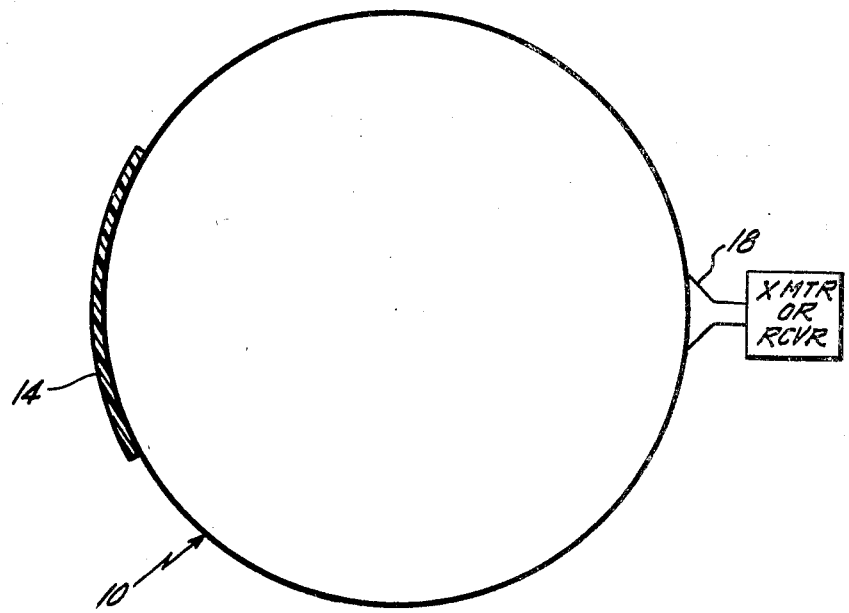
FIGURE 3 is a cross-section in schematic form of an alternative embodiment of the invention of FIGURE 1 wherein a horn is substituted for the metal cap.
Figure 4:
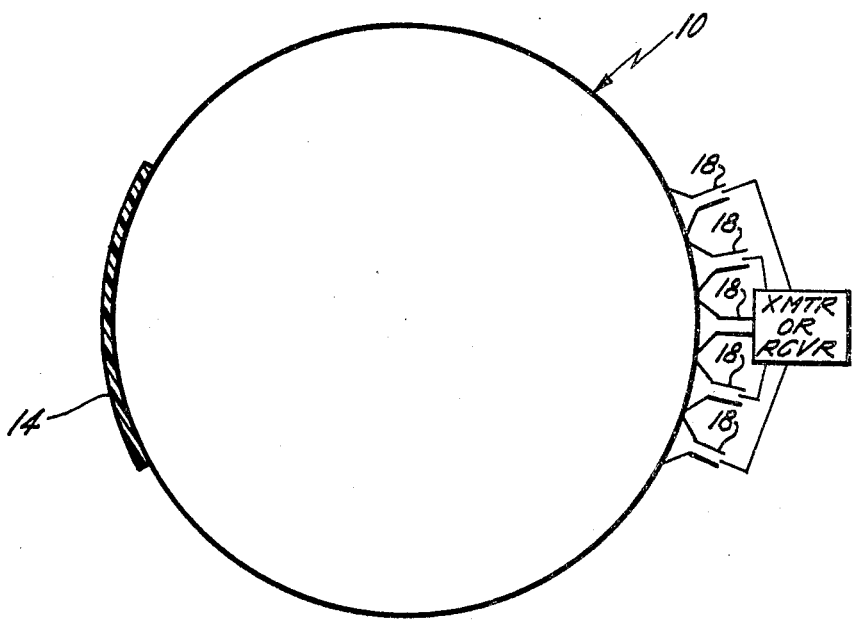
FIGURE 4 is a cross-section in schematic form of still another embodiment of this invention wherein the metal reflector cap is replaced by an array of horns.

As shown in FIGURE 3, the structure may include a horn 18 and in FIGURE 4, an array of horns 18, in lieu of the reflecting cap 12 to receive or transmit energy from a conventional transmitter or receiver. An array of horns would be utilized to broaden the zone and give a maximum gain to the resultant antenna structure over the angular disposition of the array. The array of horns for this application should be arranged to encompass an angle from the center of the sphere equal to and preferably greater than the angular dimensions of the dielectric cap 14. With this embodiment, the glory ray plus the axial ray are kept in an in-phase relationship. Any receiving or transmitting antenna structure capable of utilizing the energy at the focal point may be applied in place of the cap 12 or horns 18.

From the foregoing, it can be seen that a novel dielectric focusing device, reflector or antenna has been provided which is capable of capturing, transmitting and reflecting all radiant energy, including that in the optical region, to provide maximum and constant gain over a broad angle. From diameters approximately from 7 to 10 times the wavelength of energy, the sphere of this invention provides greater gain than even the theoretical gain of a Luneberg lens, which is not achieved in practice with that type of structure.

It has been theorized that the practical Luneberg lens reflector falls short of the gains of the theoretical value by the reflections at the interfaces of the adjacent shells. Although the invention has been described relative to a sphere, which represents the preferred embodiment, since a sphere provides the maximum gain over the widest angle, it should be understood that other shapes may be utilized such as an oblate spheroid where the gain and wide angle characteristics would not be of great importance. When other shapes are utilized, the axial dimension and the thickness of the front path are adjusted according to the geometry of the structure with respect to the phases involved.

I intend to be limited only by the appended claims.

I claim:

1. A radiant energy focusing device comprising a curved object having an axis of revolution and a constant refractive index of a value which permits the existence of a glory ray, a cap on said object corresponding to the curvature thereof and having a constant thickness and refractive index, said cap being so placed and of such a size that the focal point of a glory ray and an axial ray on said axis of revolution lie on the surface of said object opposite the position of said cap and in an in-phase relationship.

2. A device as defined in claim 1 wherein said cap is integral with said object.

3. A device as defined in claim 1 wherein the indexes of refraction of said cap and said object are dissimilar.

4. A means for reciprocal focusing wherein energy at the focal point is in perfect phase with energy along a plane perpendicular to the axis of transmission comprising a curved object of constant refractive index of a value which permits existence of a glory ray and having an axis of revolution at said axis of transmission, and a dielectric cap of constant thickness and refractive index on the surface of said object opposite said focal point and intersecting said axes, said cap being of a size such that it does not affect glory rays, said focal point lying on said surface opposite said cap on said axes.

5. Means as defined in claim 4 including means for directing the energy at the focal point.

6. Means as defined in claim 5 wherein said last-mentioned means comprises a reflector cap.

7. Means as defined in claim 5 wherein said last-mentioned means comprises a receiving antenna.

8. Means as defined in claim 5 wherein said last-mentioned means comprises a transmitting antenna.

9. A radiant energy reflector comprising a sphere of constant refractive index of a value which permits existence of a glory ray, a reflective metallic spherical cap on said sphere and a dielectric cap of constant refractive index and thickness located diametrically opposed to said metallic cap and applied to said sphere, said dielectric cap being of a size such that it does not intersect the glory ray of said sphere.

10. A radiant energy reflector comprising a dielectric sphere having a constant index of refraction which permits existence of a glory ray, a spherical reflective metal cap bounded by a circle on said sphere and a dielectric cap having a constant index of refraction and thickness and bounded by a second circle on said sphere such that both of said circles have the same axis with the focal point of a glory ray and an axial ray lying on a surface opposite said dielectric cap in an in-phase relationship.

11. A radiant energy reflector as defined in claim 10 wherein said dielectric sphere and said dielectric cap have the same dielectric constant.

12. A radiant energy reflector as defined in claim 10 wherein said dielectric sphere and said dielectric cap have different dielectric constants.

13. A radiant energy reflector as defined in claim 10 where the angle from the center of the sphere to diametrically opposite edges of said dielectric cap subtends an angle less than twice the glory ray angle.

14. A radiant energy reflector as defined in claim 10 wherein the angle from the center of the sphere to diametrically opposite edges of said dielectric cap subtends an angle slightly less than the glory ray angle.

15. A radiant energy reflector as defined in claim 14 wherein the angle from the center of said sphere to diametrically opposite edges of said metal cap is subtended by an angle slightly greater than said glory ray angle.

16. A radiant energy reception or transmission apparatus comprising a sphere having a preselected index of refraction in the range which permits the existence of glory rays, a dielectric cap of constant refractive index and thickness positioned on said sphere, and means on the surface of said sphere diametrically opposed to said cap and located at the focal point of said sphere for controlling the energy at said focal point, said dielectric cap being positioned so as not to intersect with the glory ray of said sphere.

References Cited by the Examiner

UNITED STATES PATENTS

| | | | |
|---|---|---|---|
| 2,273,847 | 2/1942 | Eckel | 88—57 X |
| 2,407,680 | 9/1946 | Palmquist et al. | 88—82 |
| 2,547,416 | 4/1951 | Skellett | 343—753 X |
| 2,576,182 | 11/1951 | Wilkinson. | |
| 3,116,486 | 12/1963 | Johnson et al. | 343—755 |
| 3,145,382 | 8/1964 | Cuming et al. | 343—911 X |

FOREIGN PATENTS 609,615   10/1948   Great Britain.

OTHER REFERENCES

Van de Hulst, Light Scattering by Small Particles, John Wiley and Sons, New York, 1957, pages 250, 251, 254 relied on.

HERMAN KARL SAALBACH, *Primary Examiner.*

P. L. GENSLER, *Assistant Examiner.*